United States Patent [19]
Dody et al.

[11] Patent Number: 5,650,121
[45] Date of Patent: Jul. 22, 1997

[54] COATED EXPENDABLE REFRACTORY LINING HAVING IMPROVED RESISTANCE TO EROSIVE AND CORROSIVE MATERIALS

[75] Inventors: Julie Annette Dody, Easton, Pa.; Charles R. Rumpeltin, Jr., Flanders, N.J.

[73] Assignee: Minerals Technologies, Inc., New York, N.Y.

[21] Appl. No.: 470,655

[22] Filed: Jun. 6, 1995

Related U.S. Application Data

[62] Division of Ser. No. 226,206, Apr. 11, 1994, Pat. No. 5,512,316.

[51] Int. Cl.$^6$ .................................................. B22D 41/02
[52] U.S. Cl. .................. 266/280; 106/38.22; 106/690; 106/691; 266/44; 428/325; 428/332; 428/446; 501/94; 501/109; 501/123; 501/124; 501/125; 501/113; 501/127; 501/141
[58] Field of Search .................. 266/44, 280; 501/94, 501/99, 109, 123, 113, 124, 125, 127, 141; 428/325, 332, 447

[56] References Cited

U.S. PATENT DOCUMENTS

| | | | |
|---|---|---|---|
| 3,637,412 | 1/1972 | Felice, et al. | 117/26 |
| 4,012,029 | 3/1977 | Seguin et al. | 266/275 |
| 4,443,259 | 4/1984 | Nooden | 106/38.27 |
| 4,461,789 | 7/1984 | Takashima | 427/426 |
| 4,545,568 | 10/1985 | Rothfuss et al. | 266/280 |
| 4,696,455 | 9/1987 | Johnson | 266/44 |
| 4,869,468 | 9/1989 | Johnson | 266/44 |
| 4,908,234 | 3/1990 | Daussan et al. | 427/236 |
| 5,036,029 | 7/1991 | Johnson | 501/121 |
| 5,302,563 | 4/1994 | Rumpeltin et al. | 501/111 |

FOREIGN PATENT DOCUMENTS 55-15948  2/1980  Japan.

OTHER PUBLICATIONS

Y. Naruse et al. "Slurry Adding Gunning Method of CAstable Refractories," *Refracyory*, pp. 22–24, No. 4 (1981).

*Primary Examiner*—Archene Turner
*Attorney, Agent, or Firm*—Pennie & Edmonds LLP

[57] ABSTRACT

The disclosed invention provides a method of forming refractory linings for maintaining refractory linings against attack by corrosive materials such as those present in steel manufacture. The method entails spraying an aqueous mixture of a refractory composition that includes at least one refractory material onto the working surface of a refractory lining. Spraying is performed to provide one or more layers of the refractory composition on the refractory lining after each exposure of the lining to corrosive materials such as those incurred in steel manufacture.

21 Claims, No Drawings

COATED EXPENDABLE REFRACTORY LINING HAVING IMPROVED RESISTANCE TO EROSIVE AND CORROSIVE MATERIALS

This is a division of application Ser. No. 08/226,206, filed Apr. 11, 1994 now U.S. Pat. No. 5,512,316.

The invention relates to refractory linings and methods of maintaining those linings. More particularly, the invention is directed to preserving refractory linings from attack by corrosive materials such as those produced during manufacture of molten metals.

BACKGROUND OF THE INVENTION

In the metal casting industry, it is customary to employ vessels such as furnaces, tundishes and ladles to manufacture and transfer molten metals. These vessels are protected against molten metals and slags by expendable refractory linings.

The expendable refractory linings are exposed to severe operating environments due to corrosive attack by the molten slags and metals. The refractory linings also are exposed to thermal shock which can cause premature failure of the refractory.

The severe operating conditions faced by expendable linings reduces substantially the thickness of the linings, thereby precipitating expensive replacement of the linings. The art has attempted to address this problem by providing zoned linings. Zoned linings comprise differing compositions between the top portion of the ladle which contacts molten slag and the lower portion which only contacts the metal. The zoned linings of the art may include, for example, 80–90% alumina brick in the upper portion, and 70% alumina brick in the lower portion. Other types of refractory compositions which have been used for the upper portion of the lining have included magnesia, magnesia-chrome, dolomite, and magnesia carbon.

The art also has attempted to maintain expendable linings by gunning a patch of refractory material onto the damaged portion of the lining. In gunning, a wet mixture having about 7 to 15 percent moisture content is applied to a damaged portion of the lining. Gunning typically is performed after 1–3 inches of lining have been eroded and/or corroded from the original thickness of the lining.

Although gunning has been useful for maintaining linings, gunning is time consuming and requires application of large amounts of material. Typically, gunning requires about 11–14 minutes to apply a one-ton batch of material to the expendable lining of a commercial scale, steel ladle when using an application rate of about 140–180 lbs/minute. Gunning can also require excessive time for drying of the applied material, i.e., 4–6 hours, and generates excessive waste due to rebound. A further disadvantage of gunning is that it produces a rougher surface which is more prone to attack by the slag, and therefore can cause increased erosion of the applied patch.

The art has attempted to improve the corrosion resistance of expendable linings. See W. F. Caley et al., "Chemical and Mineralogical Examination of a $4Cr_2O_3$ MgO Coating Applied to a Bloating Fireclay Brick," *Canadian Metallurgical Quarterly*, Vol. 26, No. 3, pp. 259–264, (1987). Caley et al. teaches painting a mixture of MgO—$CrO_2$ onto a fire clay brick. Although Caley et al. teach painting a coating to improve the corrosion resistance of the brick, Caley et al. do not teach maintaining the brick against repeated exposure to slags and molten metals. A need therefore continues for cost effective methods for maintaining expendable refractory linings.

SUMMARY OF THE INVENTION

The invention is directed to a method of maintaining a refractory lining against repeated attack by corrosive materials. The method entails spraying an aqueous mixture of a refractory composition comprising at least one refractory material, a plasticizer and a high temperature binder onto an expendable lining. Spraying is continued to provide at least one layer of the aqueous mixture on the lining. The sprayed layer maintains the refractory lining against attack by corrosive materials such as molten slags and molten metals, especially against attack by acid and basic slags, and steel.

In the method of the invention, spraying of the aqueous mixture can be performed to provide a layer of refractory compositions of a thickness of about 0.125 inch to about 1.5 inch both prior to exposing as well as after exposing the lining to corrosive materials. Desirably, spraying is performed prior to initial exposure of the refractory lining to the corrosive materials, and spraying is repeated after each exposure of the lining to those corrosive materials. Spraying can be performed while the lining material is at a temperature of about 55° F. to about 3000° F., preferably about 1000°–1500° F.

The invention advantageously reduces waste material, as well as uses relatively small amounts of material. Typically, 200–300 pounds of material can be employed to spray a layer of material onto a commercial scale ladle. In contrast, gunning requires 1000 or more pounds per application.

Having briefly summarized the invention, the invention will now be described in detail by reference to the following specification and non-limiting examples. Unless otherwise specified, all percentages are by weight and all temperatures are in degrees Fahrenheit.

DETAILED DESCRIPTION OF THE INVENTION

An aqueous mixture of a refractory composition is sprayed onto an expendable lining to provide a layer of the refractory composition on the lining. The aqueous mixture typically has a viscosity of 100–500 centipoise, preferably 135 centipoise, as measured by a Brookfield viscometer. The aqueous mixture can be sprayed at flow rates of about 80 to 120 lb/min, preferably 100 lb/min, onto expendable linings which are at temperatures of about 55° F. to about 3000° F., preferably 1000°–1500° F. Under these conditions, spraying of a commercial scale ladle slag line that has a diameter of about 18 feet and a width of about 4 feet can be performed in less than about five minutes. This time period is sufficient to spray up to about 500 pounds of the aqueous mixture to yield a layer of refractory composition of a thickness of about 0.125" to 1.5" on the lining. This mixture also can be sprayed onto the entire refractory surface of the ladle. The time to complete the spraying and the amount of material used will depend on the size of the ladle and the application thickness desired.

The aqueous mixture may be sprayed to provide one or more layers of the refractory composition onto the refractory liner. Expendable refractory linings which can be treated in accordance with the invention include but are not limited to magnesia-carbon, dolomite, zirconia, magnesia-chrome, fireclay, and alumina. The aqueous mixture of refractory composition is formed by mixing a refractory material, a high temperature binder, and a plasticizer with about 25–50% aqueous vehicle based on the total weight of solids.

The refractory material employed in the aqueous mixture can be water insoluble and hydration resistant refractories or mixtures thereof. Useful refractory materials include magnesia, olivine, fireclay, dolomite, calcia, zirconia, alumina, silica, chromite, graphite, zircon and mixtures thereof. Preferably, the refractory material employed in the aqueous mixture is a basic refractory such as a blend of magnesia and olivine.

A preferred refractory composition includes about 80 to 95% refractory material, 0.1 to 5% plasticizer, and 0.1 to 10% high temperature binder wherein the percentages are based on the total weight of solids in said mixture. Preferably, the refractory material is a blend of magnesia and olivine wherein magnesia may be about 30–95% of the refractory composition and olivine may be present in an amount of up to about 65% of the composition. Most preferably, the refractory composition is a blend of about 35% by weight magnesia with about 59.6% olivine, about 5% sodium silicate, and about 0.4% bentonite.

Plasticizers useful in the refractory compositions include but are not limited to clays such as ball clay, kaolinite, or bentonite, aluminum hydroxide, and starch, preferably bentonite. High temperature binders useful in the refractory compositions include but are not limited to sodium phosphate, potassium phosphate, ammonium phosphate, magnesium phosphate, calcium phosphate, sodium silicate, potassium silicate, magnesium silicate, calcium silicate, sodium sulfate, potassium sulfate, magnesium sulfate, calcium sulfate, ammonium sulfate, zirconium sulfate, and aluminum sulfate, preferably sodium silicate. These plasticizers and high temperature binders are commercially available.

Refractory materials such as magnesia, olivine, dolomite, calcia, zirconia, alumina, silica, chromite, graphite, and zircon are also commercially available. For example, magnesia, i.e., MgO, can be derived from sources such as natural, seawater or brine magnesite, or mixtures thereof. The magnesia preferably is dead burned magnesia. By "dead burned" magnesia is meant magnesia fired to high temperatures to produce a water insoluble and hydration resistant refractory which is formed substantially completely of well-sintered, low porosity crystals to distinguish it from reactive lower temperature calcined caustic magnesite. Such materials are commercially available in purities of 60–99%.

The aqueous mixture can optionally include deflocculants, viscosity control agents, as well as organic binders. Useful deflocculants include but are not limited to anionic dispersants such as carboxylates, phosphates such as sodium phosphate, calcium phosphate and the like, sulfosuccinates such as Geropon-WT-27 from Rhone-Poulanc, sodium alkyl sulfonates, lignosulfonates such as calcium lignosulfonate, or mixtures thereof. The organic binders employed in the mixture may be any organic binder or mixtures of organic binders known for use in the refractory making and allied industries. The organic binders may be present in amounts effective to bind the refractory material onto the surface of the expendable refractory liner. Useful organic binders include but are not limited to starches, organic acids such as citric acid, tataric acid, maelic acid and the like, and organic resins such as phenol formaldehyde, urea formaldehyde, and the like. Useful viscosity control agents which may be employed include xanthan gum, and starches.

Spraying of the aqueous mixture is performed to yield at least one layer thereof on the expendable lining. Spraying of the aqueous mixture advantageously is performed prior to exposing the lining to corrosive materials. After completion of one or more heats of molten metal such as steel, an additional coating of the aqueous mixture refractory composition is sprayed onto the lining.

Commercially available equipment can be used to mix the refractory material with an aqueous vehicle to yield an aqueous mixture suitable for spraying. The aqueous mixture can be delivered to a conventional spray gun nozzle by commercially available pumps or pressurized vessels for spraying onto the expendable lining. Sprayable aqueous mixtures suitable for use in the invention typically contain about 25–50% by weight water based on total weight of solids in the mixture.

The aqueous mixture may be sprayed with spray apparatus equipped with means to provide for traveling and turning. The spray apparatus, as well as the conditions for operating the apparatus, however, do not form an essential part of the invention. Useful apparatus may include conventional batch-type or continuous-type spray devices. These devices include a mixing tank equipped with a stirring apparatus to prevent sedimentation of the solids portion of the aqueous mixture. These devices are capable of spraying at a pressure of 50–100 psi.

During spraying, the aqueous mixture is conveyed from a pressurized tank to a spray nozzle under pressures of about 40 to 70 psi, preferably 50 psi. Optionally, auxiliary air pressure can be injected into the aqueous mixture at any desired point within a hose that carries the, aqueous mixture to enable more precise control of the spray process. The added air pressure may vary from about 10–25 psi, preferably about 15 psi. The amounts of water and refractory composition in the aqueous mixtures employed in the invention are such as to enable the refractory composition to provide a dense layer of the refractory composition on the expendable lining. The refractory composition typically is present in the aqueous mixture in an amount of about 50 to 75% by weight of the mixture. Specific amounts of other refractory materials, high temperature binders, plasticizers, and aqueous vehicle readily can be determined by the art skilled.

During spraying of the mixture, the spray gun nozzle can be moved in various directions accompanied by reciprocal movement and spiral movement relative to the surface of the expendable lining. The speed of the spray gun relative to the surface of the expendable lining typically is 8–16 inches/sec. Specific speeds can readily be determined by the art skilled.

The aqueous mixture can be sprayed in any direction to form one or more dense layers on the expendable refractory lining. The aqueous mixture can be vertically upwardly sprayed onto expendable refractory linings positioned as roofs in vessels such as furnaces. Strong adherent, protective refractory layers therefore can be formed on the expendable refractory lining irrespective of the configuration of the lining. Plane and curved surfaces having voids as well as convex and concave portions can thereby be provided with protective refractory layers. Layers of refractory compositions therefore can be formed on expendable linings disposed within vessels such as blast furnaces, converters, reverberatory furnaces, ladles, tundishes, vessels for treating molten metals used in the Rheinetahl-Hereus process and Dortmund Huttenunion process, as well as various appliances and apparatus used therewith.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth in degrees Fahrenheit; unless otherwise indicated, all parts and percentages are by weight.

EXAMPLE 1

Example 1 shows an aqueous mixture of refractory composition suitable for spraying onto an expendable magnesia-carbon lining. The mixture, as well as spray conditions, type of expendable refractory lining, and the maintenance effect of the sprayed refractory coating on the expendable lining are shown in Table 1. The maintenance effect is illustrated by the percent of the original thickness of the expendable refractory lining that is retained after 35 heats of steel at 2650°–3100° F. As shown in Table 1, magnesia-carbon refractory lining treated in accordance with the invention retains 54% of its original thickness after 35 heats of molten steel. By comparison, uncoated magnesia-carbon refractory lining retained only 35% of its original thickness.

TABLE 1

| AQUEOUS MIXTURE COMPONENTS % | Example 1 |
| --- | --- |
| Magnesia[1,2] | 35 |
| Olivine #200[1,3] | 30 |
| Olivine #400[1,4] | 29.6 |
| Sodium Silicate[1] | 5.0 |
| Bentonite[1] | 0.4 |
| Water[1] | 38.0 |
| Expendable Refractory Lining | MgO—Carbon |
| Spray Feed Rate (LB/MIN)[5] | 83.3 |
| Tank Pressure (PSI)[5] | 50 |
| Air Injection Pressure (PSI)[5] | 15 |
| Time of Spraying (MINUTES)[5] | 3 |
| Refractory Lining Temperature (F.) During Spraying[5] | 1750 |
| Applied Layer Thickness (INCHES)[5] | 0.375 |
| Percent Original Refractory Lining Thickness Retained[6] | 54 |

[1]Percent by weight of total solids
[2]–100 mesh, with typically 65% –325 mesh
[3]–100 mesh, with typically 81% –325 mesh
[4]–200 mesh, with typically 98% –325 mesh
[5]Averaged over 35 heats.
[6]Measured after 35 heats.

EXAMPLES 2–5

Examples 2–5 illustrate additional compositions which may be employed in the invention.

TABLE 2

| AQUEOUS MIXTURE COMPONENTS % | Example 2 | Example 3 | Example 4 | Example 5 |
| --- | --- | --- | --- | --- |
| Magnesia[1,2] | 64.6 | 74.6 | 84.6 | 94.6 |
| Olivine #200[1,3] | 30.0 | 20.0 | 10.0 | — |
| Olivine #400[1,4] | 0.0 | — | — | — |
| Sodium Silicate[1] | 5.0 | 5.0 | 5.0 | 5.0 |
| Bentonite[1] | 0.4 | 0.4 | 0.4 | 0.4 |
| Water[1] | 31.7 | 30.4 | 30.4 | 28.0 |

[1]Percent by weight of total solids
[2]–100 mesh, with typically 65% –325 mesh
[3]–100 mesh, with typically 81% –325 mesh
[4]–200 mesh, with typically 98% –325 mesh Other aspects of the invention will be apparent to those skilled in the art from consideration of the specification, or from practice of the invention disclosed herein. It is intended that the specification and examples be considered as exemplary only, with the scope and spirit of the invention being indicated by the following claims.

We claim:

1. A coated expendable refractory lining having improved resistance to erosive and corrosive materials comprising a refractory lining and a layer of refractory material thereon, wherein said layer is formed from a blend comprising refractory material, high temperature binder, and plasticizer.

2. The coated lining of claim 1 wherein said blend has a particle size less than about 100 mesh.

3. The coated lining of claim 1 wherein said lining comprise magnesia-carbon, dolomite, magnesia-chrome, fireclay, zirconia, or alumina.

4. The coated lining of claim 1 wherein said layer has a thickness of about 0.125 inches to about 1.5 inches.

5. The coated lining of claim 1 wherein said layer comprises a blend of about 80 to 95% refractory, about 0.1 to 5% plasticizer, and about 1 to 10% high temperature binder.

6. The coated lining of claim 5 wherein said refractory material in the layer comprises at least one of magnesia, olivine, dolomite, calcia, zirconia, alumina, silica, chromite, graphite, zircon or mixtures thereof, said plasticizer is selected from the group of clay, aluminum hydroxide, starch, and mixtures thereof, and said high temperature binder is selected from the group of sodium phosphate, potassium phosphate, ammonium phosphate, magnesium phosphate, calcium phosphate, sodium silicate, potassium silicate, magnesium silicate, calcium silicate, sodium sulfate, potassium sulfate, magnesium sulfate, calcium sulfate, ammonium sulfate, zirconium sulfate, and aluminum sulfate, and mixtures thereof.

7. The coated lining of claim 5 wherein said blend comprises about 35% magnesia, about 59.6% olivine, about 5% sodium silicate, and about 0.4% bentonite.

8. The coated lining of claim 1, wherein said binder has an effective temperature range up to at least 3000° F.

9. The coated lining of claim 1, wherein the blend comprises about 30 to 65% magnesia and about 10 to 65% olivine as refractory materials, the high temperature binder is a silicate, and the plasticizer is a clay.

10. A coated expendable refractory lining having improved resistance to erosive and corrosive materials comprising a refractory lining and a layer of refractory material thereon, wherein said layer is formed from a blend comprising about 80% to 95% of a refractory material of magnesia, olivine, fireclay, dolomite, calcia, zirconia, alumina, silica, chromite, graphite, zircon, or mixtures thereof; about 0.1 to 10% of a high temperature binder having an effective temperature range up to at least 3000° F., said high temperature binder comprising a phosphate, silicate, or sulfate; and about 0.1 to 5% of a plasticizer of clay, starch, or aluminum hydroxide.

11. The coated lining of claim 10, wherein said layer has a thickness of about 0.125 inch to about 1.5 inch.

12. The coated lining of claim 10, wherein the refractory material is selected from the group consisting of magnesia-carbon, dolomite, magnesia-chrome, fireclay, zirconia, and alumina.

13. The coated lining of claim 10, wherein said refractory material is a mixture of magnesia and olivine.

14. The coated lining of claim 10, wherein the high temperature binder is sodium silicate.

15. The coated lining of claim 10, wherein the plasticizer is bentonite.

16. A coated expendable refractory lining having improved resistance to erosive and corrosive materials comprising a refractory lining and a layer of refractory material thereon, wherein said layer is formed from a blend consisting essentially of about 80% to 95% of a refractory material of magnesia, olivine, fireclay, dolomite, calcia, zirconia, alumina, silica, chromite, graphite, zircon, or mixtures thereof; about 0.1 to 10% of a high temperature binder having an effective temperature range up to at least 3000° F., said high temperature binder comprising a phosphate, silicate, or sulfate; and about 0.1 to 5% of a plasticizer of clay, starch, or aluminum hydroxide.

17. The coated lining of claim 16, wherein said layer has a thickness of about 0.125 inch to about 1.5 inch.

18. The coated lining of claim 16, wherein the refractory material is selected from the group consisting of magnesia-carbon, dolomite, magnesia-chrome, fireclay, zirconia, and alumina.

19. The coated lining of claim 16, wherein said refractory material is a mixture of magnesia and olivine.

20. The coated lining of claim 16, wherein the high temperature binder is sodium silicate.

21. The coated lining of claim 16, wherein the plasticizer is bentonite.

* * * * *